(12) United States Patent
Whikehart

(10) Patent No.: US 8,249,205 B2
(45) Date of Patent: Aug. 21, 2012

(54) HD RADIO DIVERSITY RECEIVER WITH SHARED PROCESSING PATHS

(75) Inventor: J. William Whikehart, Milford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 390 days.

(21) Appl. No.: 12/613,159

(22) Filed: Nov. 5, 2009

(65) Prior Publication Data

US 2011/0103435 A1 May 5, 2011

(51) Int. Cl.
*H04B 7/10* (2006.01)
*H04L 1/02* (2006.01)

(52) U.S. Cl. ........ 375/347; 375/349; 375/346; 375/350; 375/267; 455/500; 455/101

(58) Field of Classification Search .................. 375/347, 375/349, 346, 350, 267; 455/500, 101
See application file for complete search history.

(56) References Cited

U.S. PATENT DOCUMENTS

| | | | |
|---|---|---|---|
| 6,204,884 B1 * | 3/2001 | Lee | 348/555 |
| 6,633,258 B2 * | 10/2003 | Lindenmeier et al. | 342/374 |
| 6,633,325 B1 * | 10/2003 | Lee | 348/21 |
| 6,937,677 B2 | 8/2005 | Strolle et al. | |
| 6,970,523 B2 | 11/2005 | Strolle et al. | |
| 7,305,056 B2 | 12/2007 | Kroeger | |
| 7,466,959 B2 | 12/2008 | DeMoor et al. | |
| 8,027,652 B2 * | 9/2011 | Gilbert | 455/142 |
| 2005/0003772 A1 | 1/2005 | Nemoto | |
| 2005/0105657 A1 | 5/2005 | Kroeger et al. | |
| 2005/0111600 A1 * | 5/2005 | Okada | 375/347 |
| 2006/0025097 A1 * | 2/2006 | Zahm | 455/277.1 |
| 2007/0004335 A1 | 1/2007 | DeMoor et al. | |

* cited by examiner

*Primary Examiner* — Phuong Phu
(74) *Attorney, Agent, or Firm* — Fraser Clemens Martin & Miller LLC; J. Douglas Miller

(57) ABSTRACT

A receiver including a plurality of antennas for receiving at least one radio signal, an analog processing path in signal communication with at least one of the antennas, a digital processing path in signal communication with at least one of the antennas, and a processor for controlling a processing of the at least one radio signal, wherein the at least one radio signal is processed by at least one of the analog processing path and the digital processing path.

19 Claims, 1 Drawing Sheet

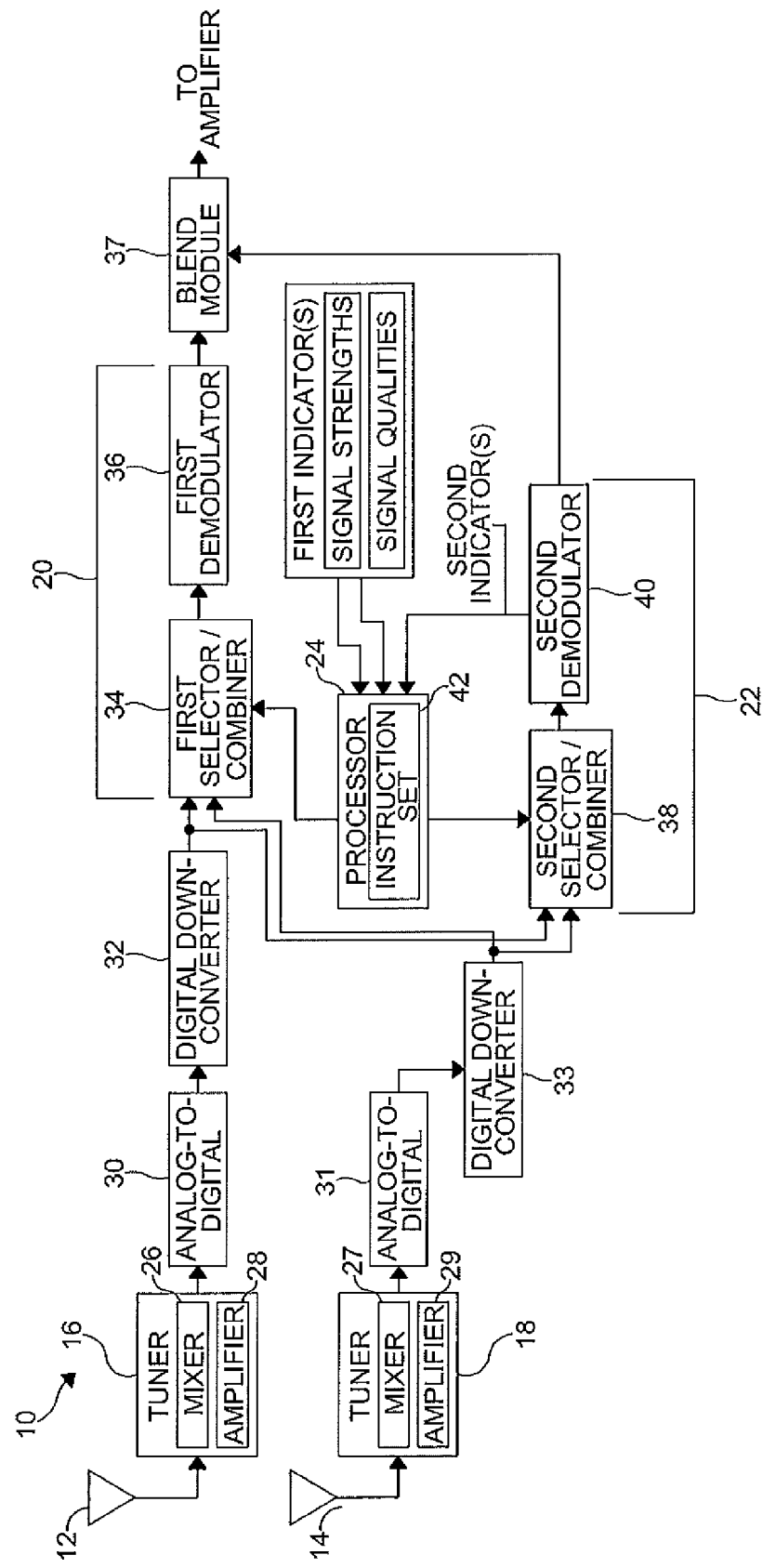

HD RADIO DIVERSITY RECEIVER WITH SHARED PROCESSING PATHS

FIELD OF THE INVENTION

The present invention relates generally to a radio receiver. More particularly, the invention is directed to a diversity receiver with shared processing paths and a method of processing a radio signal.

BACKGROUND OF THE INVENTION

For many years, analog-only Frequency Modulated (FM) receivers have included space-diversity antenna systems and diversity processing to reduce multipath degradation. Diversity is also used in Digital Video Broadcasting (DVB) receivers for multipath mitigation. However, current HD Radio receivers are not equipped with a spaced diversity antenna system for shared processing between an analog part and a digital part of the HD Radio receiver. HD Radio refers to the technology developed by the iBiquity Company for the broadcast and reception of digitally-modulated radio signals in the AM and FM bands.

It would be desirable to develop a diversity receiver with shared processing paths and a method of processing a radio signal using shared processing paths.

SUMMARY OF THE INVENTION

Concordant and consistent with the present invention, a diversity receiver with shared processing paths and a method of processing a radio signal using shared processing paths, has surprisingly been discovered.

DVB receivers and HD Radio receivers both use orthogonal frequency division multiplexing (OFDM). Therefore, reception of a digitally-modulated part of a radio signal in and HD Radio receiver can benefit from space-diversity similar to a DVB systems benefit. Just as a non-diversity HD Radio receiver benefits from a shared path of antenna, tuner processing, A/D conversion and digital down conversion, an HD Radio receiver can share two such paths to reduce the effects of multipath on digital reception. Use of diversity for HD Radio reception can increase the reception range of HD Radio so that it is closer to that of analog radio, thus increasing the value of the HD Radio feature.

In one embodiment, a receiver comprises: a plurality of antennas for receiving at least one radio signal; an analog processing path in signal communication with at least one of the antennas; a digital processing path in signal communication with at least one of the antennas; and a processor for controlling a processing of the at least one radio signal, wherein at least one radio signal is processed by at least one of the analog processing path and the digital processing path.

In another embodiment, a diversity receiver comprises: a plurality of antennas for receiving at least one radio signal, each of the antennas in signal communication with at least one of a plurality of tuner circuits; an analog processing path in signal communication with at least one of the tuner circuits and including a first selector/combiner; a digital processing path in signal communication with at least one of the tuner circuits and including a second selector/combiner; and a processor in communication with at least one of the first selector/combiner and the second selector/combiner for controlling a processing of the at least one radio signal, wherein the at least one radio signal is processed by at least one of the analog processing path and the digital processing path.

The invention also provides methods for processing a radio signal.

One method comprises the steps of: providing a plurality of antennas for receiving at least one radio signal; providing an analog processing path in signal communication with at least one of the antennas and including a first selector/combiner; providing a digital processing path in signal communication with at least one of the antennas and including a second selector/combiner; providing a processor to control a processing of the at least one radio signal, wherein the at least one radio signal is processed by at least one of the analog processing path and the digital processing path; and providing a blend module in signal communication with each of the analog processing path and the digital processing path to mix a signal received from the analog processing path with a signal received from the digital processing path.

BRIEF DESCRIPTION OF THE DRAWINGS

The above, as well as other advantages of the present invention, will become readily apparent to those skilled in the art from the following detailed description of the preferred embodiment when considered in the light of the accompanying drawing which is a schematic block diagram of a receiver according to an embodiment of the present invention.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Referring to the drawing, there is illustrated a receiver 10 according to an embodiment of the present invention. The receiver 10 includes a plurality of antennas 12, 14, each antenna 12, 14 in communication with at least one of a plurality of tuner circuits 16, 18. Each of the tuner circuits 16, 18 is in communication with each of an analog processing path 20 and a digital processing path 22, which are interconnected via a processor 24 for shared processing of signals derived from the signals received at the antennas.

The antennas 12, 14 are each adapted to receive a broadcast radio frequency (RF) signal and transmit the RF signal to one of the tuner circuits 16, 18. The antenna 12 may be any device for receiving broadcast signals having a pre-determined range of frequencies, for signals being both analog-modulated and digitally modulated.

The tuner circuits 16, 18 are adapted to "tune" an associated one of the antennas 12, 14 to a pre-determined narrow range of frequencies from the total spectrum of broadcast signals and ambient radio waves. As shown, the tuner circuits 16, 18 each include a mixer 26, 27 and an amplifier 28, 29 which cooperate to generate a carrier-based signal in the form of an intermediate frequency (IF) signal having a lower frequency than the original broadcast frequency. It is understood that the tuner circuits 16, 18 may include additional components and features such as automatic gain control, for example. It is further understood that the tuner circuits 16, 18 may be controlled or modified to tune to any signal channel or frequency range, as desired.

In the embodiment shown, the tuner circuits 16, 18 are in signal communication with the analog processing path 20 and the digital processing path 22 via an analog-to-digital converter (ND converter) 30, 31 and a digital down converter (DDC) 32, 33.

The A/D converter 30, 31 is adapted to receive a continuous signal and convert the signal into a discrete digital representation, as can be appreciated by someone skilled in the art of digital signal processing. Specifically, the A/D converter 30, 31 is adapted to receive the IF signal from at least one of the tuner circuits 16, 18, convert the IF signal, and transmit a digital representation of the IF signal to the associated DDC 32, 33. It is understood that the A/D converter 30, 31 may be any analog-to-digital conversion devices or systems, now known or later developed.

The DDC 32, 33 converts the digitized IF signal to a baseband signal centered nominally at zero frequency. In addition to down conversion, the DDC 32, 33 may decimate the IF signal to a lower sampling rate. In certain embodiments, such as "wideband" systems, mixing and/or tuning functions are implemented within the digital down converter 32,33, wherein the A/D converter 30, 31 operates essentially on the original RF signal instead of an IF signal.

The analog processing path 20 is adapted to receive a signal from any one of the tuner circuits 16, 18. As a non-limiting example, the analog processing path 20 may receive the signal directly from at least one of the digital down converters 32, 33. As shown, the analog processing path 20 includes a first selector/combiner 34 and a first demodulator 36.

The first selector/combiner 34 is in signal communication with each of the tuner circuits 16, 18. The first selector/combiner 34 can block or accept any number of signals transmitted from any of the tuner circuits 16, 18 and the digital down converters 32, 33. In certain embodiments, the first selector/combiner 34 receives a combination of signals from any of the tuner circuits 16, 18 and the digital down converters 32, 33. The first selector/combiner 34 can adjust at least one of an amplitude and a phase of a signal routed to the analog processing path 20. As shown, the first selector/combiner 34 is in signal communication with the processor 24 to receive a control signal therefrom to control the functionality of the first selector/combiner 34.

The first demodulator 36 is adapted to receive an analog modulated portion of at least one IF signal from at least one of the tuner circuits 16, 18, process the received IF signal, and extract an information content from a modulated carrier wave of the IF signal. In certain embodiments the information content extracted from the carrier wave is a digital data representing an audio signal. It is understood that any information content may be extracted. It is further understood that a filter may be used to control a portion of the IF signal being processed by the analog processing path 20.

The first demodulator 36 transmits a recovered signal representing a demodulated form of the IF signal. In certain embodiments, the first demodulator 36 is a quadrature demodulator or detector as is known in the art. However, other devices, systems, and methods of demodulation may be used such as a phase-locked loop circuit, a Foster-Seeley discriminator, and other electronic filters and detectors, for example. It is understood that the audio signal may be transmitted to further processing components such as a stereo decoding circuit (not shown), for example. As shown, the first demodulator 36 transmits the audio signal to a blend module 37 to be mixed with an incoming audio signal from the digital processing path 22.

The digital processing path 22 is adapted to receive a signal from any one of the tuner circuits 16, 18. As a non-limiting example, the digital processing path 20 may receive the signal directly from at least one of the digital down converters 32, 33. As shown, the digital processing path 22 includes a second selector/combiner 38 and a second demodulator 40.

The second selector/combiner 38 is in signal communication with each of the tuner circuits 16, 18. The second selector/combiner 38 can block or accept a signal that is transmitted from any of the tuner circuits 16, 18 and the digital down converters 32, 33. The second selector/combiner 38 can adjust an amplitude and phase of a signal that passes through the digital processing path 22. As shown, the second selector/combiner 38 is in signal communication with the processor 24 to receive a control signal therefrom to control the functionality of the second selector/combiner 38.

The second demodulator 40 is adapted to receive a digitally modulated portion of at least one IF signal from at least one of the tuner circuits 16, 18, process the received IF signal, and extract an information content from a modulated carrier wave of the IF signal. It is understood that a filter may be used to control a portion of the IF signal being processed by the digital processing path 22. In certain embodiments the information content extracted from the carrier wave is a digital data representing an audio signal. It is understood that any information content may be extracted.

The second demodulator 40 transmits a recovered signal representing a demodulated form of the IF signal. In certain embodiments, the second demodulator 40 is a decoder for signals that meet the signal characteristic standards as defined for HD Radio receivers. The decoder produces an audio signal derived from the digital modulation portion of the signal. The decoder may also produce other signals such as data signals carrying information related to the audio signal. As shown, the second demodulator transmits the audio signal to the blend module 37 to be mixed with an incoming audio signal from the analog processing path 20.

The processor 24 is in communication with each of the first selector/combiner 34 and the second selector/combiner 38 for control thereof. The processor 24 extracts a plurality of first indicators relating to the radio signals received by the antennas 12, 14 such as signal strength or level and signal quality, for example. In particular, the first indicators may include a noise measurement, an adjacent channel detection, and a multipath detection. The processor 24 is also in communication with the second demodulator 40 to extract a plurality of second indicators such as bit error rate (BER), for example. In certain embodiments, the processor 24 includes an instruction set 42 embodied as a diversity control algorithm to control the analysis of the first and second indicators and the control of the selector/combiners 34, 38. It is understood that the instruction set 42 cause the processor 24 selectively control the signal path selection or combining in the selector/combiners 34, 38 to minimize for example noise and multipath conditions for the analog path and BER for example for the digital path.

In operation, the antennas 12, 14 are tuned to receive a radio signal within a particular band of frequencies. The radio signals are analyzed by the processor 24 to extract the first indicators. It is understood that the first indicators may be extracted by other processing components and transmitted to the processor 24 for analysis. In certain embodiments, the processor 24 further analyzes the first indicators to determine which of the received radio signals are passed through the analog processing path 20 and the digital processing path 22. In certain embodiments, the processor 24 processes the first and second indicators using equations, decision trees and timing functions to determine the control of the selectors/combiners 34, 38. As a non-limiting example, the processor 24 transmits a binary signal to each of the first selector/combiner 34 and the second selector/combiner 38 to control a selection of signals to process. Further, the processor 24 can analyze a feedback from the second indicators to update the control of the first selector/combiner 34 and the second selector/combiner 38.

In other embodiments, the processor 24 analyzes the first indicators and the second indicators and transmits a control signal to each of the first selector/combiner 34 and the second selector/combiner 38. Further, the processor 24 can jointly analyze the feedback from the first and second indicators and transmits a control signal to each of the first selector/combiner 34 and second selector/combiner 38. It is understood that the binary signals transmitted to each of the first selector/combiner 34 and the second selector/combiner 38 may be the same or different. As a non-limiting example, the control signals include adjustment factors that are applied to one or more of the signals received by the combiner/selectors 34, 38, wherein the adjustment factors are determined by processing the first and second indicators. As a further example, the adjustment factors include factors for changing the amplitude and/or phase of the signals received by the combiner/selectors 34, 38. It is understood that the adjustment factors transmitted to each of the first selector/combiner 34 and the second selector/combiner 38 may be the same or different. Accordingly, the processor 24, driven by the instruction set 42, can select the "best" signal and processing path configuration for overall processing.

The receiver 10 minimizes the effects of multipath and other disturbances on both the analog and digital reception while maximizing the reception range of at least one of the receivers analog and digital reception. The instruction set 42 executed by the processor 24 may be adapted to determine an optimal setting of the components of the receiver 10 to maximize the quality of a resultant audio signal.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A receiver comprising:
   a plurality of antennas for receiving at least one radio signal;
   an analog processing path in signal communication with at least one of the antennas;
   a digital processing path in signal communication with at least one of the antennas; and
   a processor for controlling a processing of the at least one radio signal, wherein the at least one radio signal is processed by at least one of the analog processing path and the digital processing path, wherein the analog processing path includes a first selector/combiner in signal communication with the processor, and wherein the first selector/combiner controls a number of signals processed by the analog processing path in response to a control signal received from the processor.

2. The receiver according to claim 1, wherein the analog processing path includes a demodulator for receiving a signal from at least one of the antennas and extracting an information content from the signal.

3. The receiver according to claim 1, wherein the digital processing path includes a demodulator for receiving a signal from at least one of the antennas and extracting an information content from the signal.

4. The receiver according to claim 1, wherein the first selector/combiner combines a number of signals in response to a control signal received from the processor.

5. The receiver according to claim 1, wherein the first selector/combiner adjusts a signal characteristic of a signal received by the first selector/combiner in response to a control signal received from the processor.

6. The receiver according to claim 1, wherein the digital processing path includes a second selector/combiner in signal communication with the processor.

7. The receiver according to claim 6, wherein the second selector/combiner controls a number of signals processed by the digital processing path in response to a control signal received from the processor.

8. The receiver according to claim 6, wherein the second selector/combiner combines a number of signals in response to a control signal received from the processor.

9. The receiver according to claim 6, wherein the second selector/combiner adjusts a signal characteristic of a signal received by the second selector/combiner in response to a control signal received from the processor.

10. The receiver according to claim 1, wherein the processor receives a plurality of first indicators relating to the at least one radio signal received by the antennas and controls the processing of the at least one radio signal based upon the first indicators.

11. The receiver according to claim 3, wherein the processor receives a plurality of second indicators from the demodulator and controls the processing of the at least one radio signal based upon the second indicators.

12. The receiver according to claim 1, further comprising an analog-to-digital converter in signal communication with at least one of the antennas and at least one of the analog processing path and the digital processing path.

13. A diversity receiver comprising:
   a plurality of antennas for receiving at least one radio signal, each of the antennas in signal communication with at least one of a plurality of tuner circuits;
   an analog processing path in signal communication with at least one of the tuner circuits and including a first selector/combiner;
   a digital processing path in signal communication with at least one of the tuner circuits and including a second selector/combiner; and
   a processor in communication with at least one of the first selector/combiner and the second selector/combiner for controlling a processing of the at least one radio signal, wherein the at least one radio signal is processed by at least one of the analog processing path and the digital processing path.

14. The receiver according to claim 13, wherein the first selector/combiner controls a number of signals processed by the analog processing path in response to a control signal received from the processor and the second selector/combiner controls a number of signals processed by the digital processing path in response to a control signal received from the processor.

15. The receiver according to claim 13, wherein the first selector/combiner adjusts a signal characteristic of a signal processed by the analog processing path in response to a control signal received from the processor and the second selector/combiner adjusts a signal characteristic of a signal processed by the digital processing path in response to a control signal received from the processor.

16. The receiver according to claim 13, wherein the processor extracts a plurality of first indicators relating to the at least one radio signal received by the antennas and controls the processing of the at least one radio signal based upon the first indicators.

17. The receiver according to claim 13, wherein the analog processing path includes a first demodulator and the digital processing path includes a second demodulator, and wherein the processor receives a plurality of second indicators from the second demodulator and controls the processing of the at least one radio signal based upon the second indicators.

18. A method of processing a radio signal, the method comprising the steps of:
- providing a plurality of antennas for receiving at least one radio signal;
- providing an analog processing path in signal communication with at least one of the antennas and including a first selector/combiner;
- providing a digital processing path in signal communication with at least one of the antennas and including a second selector/combiner;
- providing a processor to control a processing of the at least one radio signal, wherein the at least one radio signal is processed by at least one of the analog processing path and the digital processing path, the processor in signal communication with at least one of the first selector/combiner of the analog processing path and the second selector/combiner of the digital processing path, wherein at least one of the first selector/combiner and the second selector/combiner controls a number of signals processed by the respective processing path in response to a control signal received from the processor; and
- providing a blend module in signal communication with each of the analog processing path and the digital processing path to mix a signal received from the analog processing path with a signal received from the digital processing path.

19. A receiver comprising:
- a plurality of antennas for receiving at least one radio signal;
- an analog processing path in signal communication with at least one of the antennas;
- a digital processing path in signal communication with at least one of the antennas; and
- a processor for controlling a processing of the at least one radio signal, wherein the at least one radio signal is processed by at least one of the analog processing path and the digital processing path, wherein the digital processing path includes a selector/combiner in signal communication with the processor, and wherein the selector/combiner controls a number of signals processed by the digital processing path in response to a control signal received from the processor.

\* \* \* \* \*